(12) United States Patent
Rideout et al.

(10) Patent No.: US 7,992,137 B2
(45) Date of Patent: Aug. 2, 2011

(54) CLIENT SERVER SYSTEM FOR ANALYSIS AND PERFORMANCE TUNING OF REMOTE GRAPHICS DEVICES

(75) Inventors: Philip A. Rideout, Fort Collins, CO (US); Jason R. Allen, Austin, TX (US); Jeffrey T. Kiel, Raleigh, NC (US); Sébastien Julien Dominé, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1034 days.

(21) Appl. No.: 11/830,721

(22) Filed: Jul. 30, 2007

(65) Prior Publication Data
US 2009/0037774 A1    Feb. 5, 2009

(51) Int. Cl.
*G06F 9/44* (2006.01)
*G06F 11/00* (2006.01)

(52) U.S. Cl. ............................ 717/131; 714/25; 717/125
(58) Field of Classification Search .................... 717/131
See application file for complete search history.

(56) References Cited

U.S. PATENT DOCUMENTS

| | | | |
|---|---|---|---|
| 5,596,714 A * | 1/1997 | Connell | 714/38 |
| 6,246,415 B1 * | 6/2001 | Grossman et al. | 345/422 |
| 7,164,419 B2 * | 1/2007 | Hill et al. | 345/419 |
| 7,417,632 B2 * | 8/2008 | Muller | 717/131 |
| 7,493,520 B2 * | 2/2009 | Bhatia | 717/130 |
| 2003/0140280 A1 * | 7/2003 | Kaler et al. | 714/37 |
| 2008/0034311 A1 * | 2/2008 | Aguaviva et al. | 717/125 |

OTHER PUBLICATIONS

Lin, Keng-Yu, "GPTT: A Cross-Platform Graphics Performance Tuning Tool for Embedded System"; National Sun Yat-sen University, Jun. 26, 2006, 61pg.*
nVidia Corporation, "GPU Performance Optimization with NVPerfHUD"; May 2006, 54pg.*

* cited by examiner

*Primary Examiner* — Wei Zhen
*Assistant Examiner* — Ryan D Coyer
(74) *Attorney, Agent, or Firm* — Patterson & Sheridan, LLP.

(57) ABSTRACT

Embodiments of the invention provide a data communications protocol and client server architecture used for the performance analysis and debugging of a graphics application running on a remote device. The remote device may be a hand-held video game console, a mobile phone, or convergence device, but may also be a personal computer system. A graphical application debugger may include a host component and a target component. The host component executes on a host system and presents a debugging interface to a developer. The target component may record data related to the performance of a graphics pipeline on the target device and transmit this data back to the host system over a communication link. The target component may be included as part of an instrumented version of a graphics device driver.

24 Claims, 7 Drawing Sheets

HOST DEVICE STATE DIAGRAM

CLIENT SERVER SYSTEM FOR ANALYSIS AND PERFORMANCE TUNING OF REMOTE GRAPHICS DEVICES

BACKGROUND OF THE INVENTION

1. Field of the Invention

Embodiments of the present invention generally relate to computer graphics and, more specifically, to a communication protocol and a client server system for the analysis and performance tuning of a graphics application executing on a remote device.

2. Description of the Related Art

The term rendering refers to a process performed by computer software and hardware in creating computer generated images that portray an object or scene. Typically, graphics hardware includes a graphics pipeline which is configured to generate successive frames by performing object geometry, vertex, and raster operations on a set of graphics primitives designated for each frame. The graphics pipeline is often highly configurable. For example, the graphics pipeline may be configured with different shader programs, lighting constants, and texture maps, among other things. A hardware driver provides an interface between a particular piece of graphics hardware and the calls provided by a graphics API. To create a frame, a graphics application invokes a "draw" call provided by the graphics API. Widely used graphics APIs include the OpenGL® API distributed by the Khronos group and the Direct3D® API distributed by Microsoft®.

A typical cycle for debugging the graphics application includes compiling and running the application. As the application is running, the developer looks for any anomalies or visual artifacts in frames rendered by the hardware and software. Visual artifacts may include elements of a frame that have an appearance other than what was intended by the developer, and non-visual anomalies includes poor performance of the graphics application, such as a low frame rendering rate. These issues may occur due to the application setting an incorrect render state, using a non-optimal or incorrect texture, or the use of incorrect parameters supplied to draw calls, among other things.

Application developers commonly perform simple experiments to diagnose and resolve these types of visual artifacts and performance issues. For example, the developer may experiment with the graphics application by tweaking program source code, adjusting a render state, or changing parameters of the graphics pipeline. The developer then runs the application to observe the result. Although this approach can be effective, it often becomes a cumbersome process. Further, when trying to diagnose and correct a problem on a certain target platforms such as an embedded or hand-held device (e.g., a hand-held video game console, a mobile phone, or convergence device), this process may be even more complicated as the graphics application must be deployed to the target device.

To address these issues resulting from a purely ad-hoc approach, graphical application debuggers are available. However, these applications typically execute on the same system as the graphics application. For graphics applications on handheld devices, however, this approach is, at best, impractical, due to the screen size of these devices. For example, most of the handheld video game devices currently available include a screen resolution of 320×240 or 640×480 pixels. Thus, the screen displays may be too small to provide developers with a useful debugging interface. Further, the hand-held device may not have the processing power (or multi-tasking capability) required to run a graphical application debugger alongside a graphical application.

As the foregoing illustrates, there remains a need in the art for a client server system for analysis and performance tuning of remote graphics devices.

SUMMARY OF THE INVENTION

Embodiments of the invention provide a data communications protocol and client server architecture used for the performance analysis and debugging of a graphics application running on a remote device. The remote device may be a hand-held video game console, a mobile phone, or convergence device, but may also be a personal computer system. In one embodiment, a graphical application debugger may include a host component and a target component. The host component executes on a host system and presents a debugging interface to a developer. The interface may provide a collection of data related to the execution state and performance of the graphical application and a graphics pipeline on the target device.

One embodiment of the present invention sets forth a method for debugging and performance-tuning a graphics application configured to execute on a target device. The method generally includes establishing a communication link between the target device and a host system executing a host component of a graphical application debugger and invoking a graphics application on the target device. The graphics application is configured to invoke graphics commands provided by an instrumented driver for a graphics pipeline present on the target device, and the instrumented driver includes a target component of the graphical application debugger configured to record data related to the execution of the graphics application on the target device. The method also includes determining a first operational state of the target component and, based on the first operational state of the target component, transmitting a portion of the data related to the execution of the graphics application on the target device to the host component over the communications link.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention provide a data communications protocol and client server architecture used for the performance analysis and debugging of a graphics application running on a remote device. The remote device may be a hand-held video game console, a mobile phone, or convergence device, but may also be a personal computer system. In one embodiment, a graphical application debugger may include a host component and a target component. The host component executes on a host system and presents a debugging interface to a developer. The interface may provide a collection of data related to the execution state and performance of the graphical application and a graphics pipeline on the target device.

The target component running on the target device may record data related to the performance of the graphics pipeline and transmit this data back to the host system over a communication link. For example, the target device may include an instrumented version of a graphics device driver configured to communicate with the host component of the graphical application debugger. In one embodiment, the connection between the host system and target device may be established at any time while the graphics application is executing on the target device. Once established, the developer may review a stream of information on the host device related to the state of the graphics pipeline and performance of the application on the target device. Further, the developer may interact with the user interface to transition between the real-time streaming mode and a debugging mode and a performance analysis mode.

Performance tools, graphs, and experiments may then be used to drill down and closely examine what has occurred in the graphics pipeline when rendering a given frame. The debugging and performance analysis modes may be used by the developer to inspect and evaluate aspects of a frame rendered by the graphics pipeline on the target device. Using this information, a developer may improve performance of the graphics application by identifying the slowest stage in the graphics pipeline and debugging functional problems. Thus, advantageously, by providing a client server system for analysis and performance tuning, embodiments of the invention allow developers to isolate and optimize performance bottlenecks in a graphics pipeline on the target device.

Figure 1:
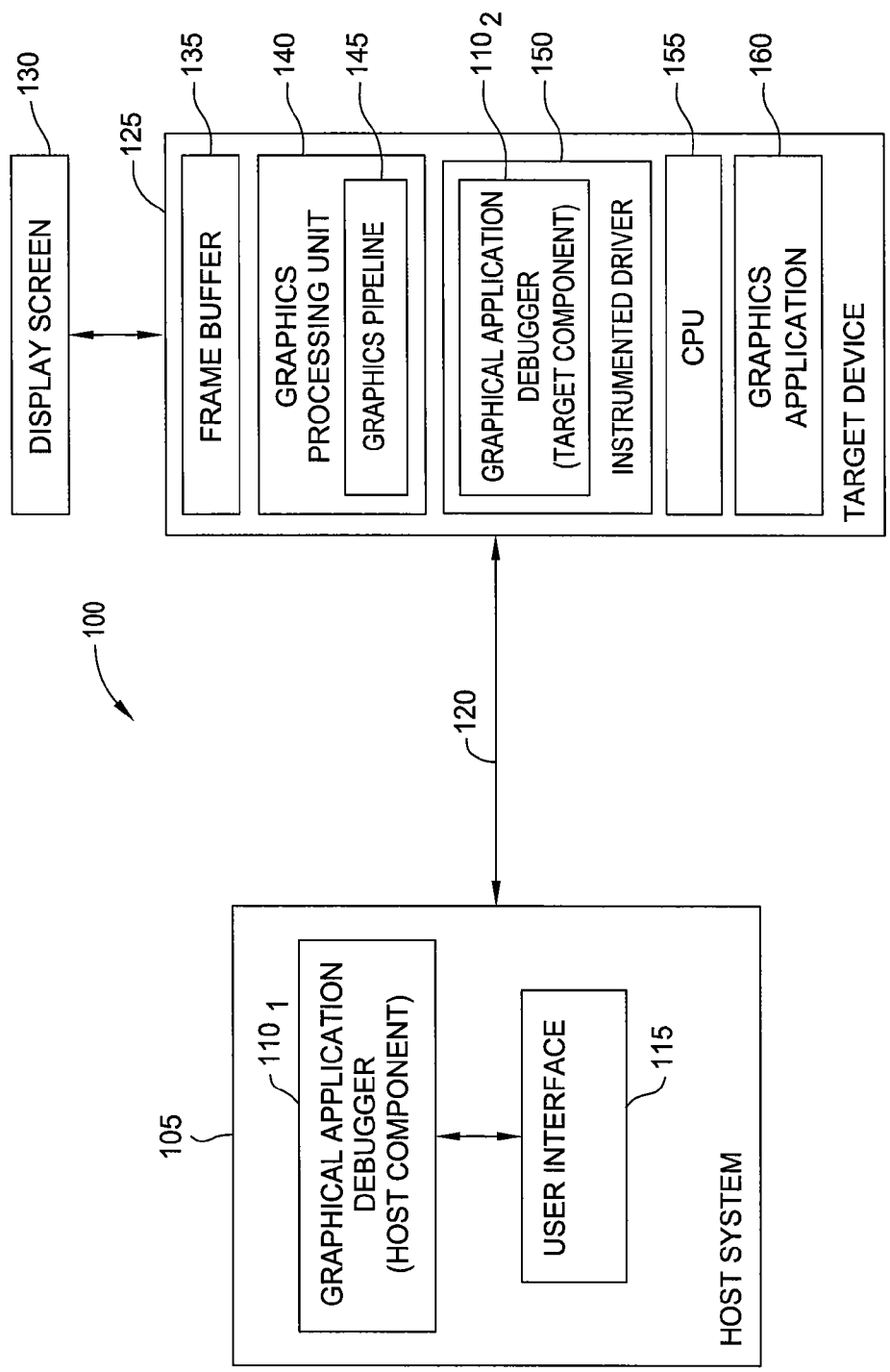
FIG. 1 is a conceptual illustration of a client server environment for analyzing a graphics application executing on a remote device, according to one embodiment of the invention.

FIG. 1 is a conceptual illustration of a client server environment 100 for analyzing a graphics application executing on a remote device, according to one embodiment of the invention. The client server environment 100 illustrated in FIG. 1 is included to be representative of existing computer systems, e.g., desktop computers, server computers, laptop computers, tablet computers, handheld devices, and the like. However, the software applications described herein are not limited to any particular computing system or device and may be adapted to take advantage of new computing systems as they become available. Those skilled in the art will recognize that the components shown in FIG. 1 are simplified to highlight aspects of the present invention and that a typical host system 105 and target device 125 may include a broad variety of additional components.

Additionally, the software applications illustrated in system 100 may be implemented to execute on a single computer system or on distributed systems communicating over computer networks such as local area networks or large, wide area networks, such as the Internet. Also, embodiments of the invention may be provided as an application program (or programs) stored on computer readable media such as a CD-ROM, DVD-ROM, flash memory module, or other tangible storage media.

As shown, client server environment 100 includes a host system 105, a target device 125 having a display screen 130, and a communication link 120. Host system 105 is a computer system configured to execute a host component $110_1$ of a graphical application debugger. User interface 115 may provide a developer with any combination of graphical elements such as windows, menus buttons, ribbons, dialog boxes, etc., used to analyze and debug a graphics application 160 running on target device 125. User interface 115 may allow the developer to initiate a debugging session and perform a variety of debugging functions. In one embodiment, user interface 115 may display an image of a frame rendered on target device 125 along with a semi-transparent overlay of graphics, charts, tables, that present data related to the performance of graphic application 160 running on target device 125.

Host system 105 may be configured to communicate with target device 125 over communication link 120. For example, host system 105 may be configured to communicate with target device 125 across a TCP/IP network or may have a direct connection such a USB, Firewire, or serial connection. Of course, other network protocols and/or connection standards may be used. Moreover, the target device and host system may be the same machine, in which case the communication link may be an inter-process messaging system. In one embodiment, a communication protocol is used by host system 105 to engage in a variety of debugging transactions with target device 125. Transactions may include commands sent from the host system 105 to target device 125 to control the configuration or state of a graphics processing unit 140 or a graphics pipeline 145. For example, commands sent over communication link 120 may allow the developer to change the animation speed of graphical application 160, select individual frames of animation to evaluate in detail, cull out specified batches of graphics primitives, temporarily alter or disable state elements of the graphics API (e.g., lighting). Other transactions may include the streaming of performance counters and graphics data from target device 125 to host system 105 (as part of a real-time streaming mode), and sending pipeline-state and frame data for a frame of animation from target device 125 to host system 105 (as part of a debugging or performance analysis mode).

Target device 125 may be any type of device configured to execute graphics application 160. Examples of target device 125 include a hand-held video game console, a hand-held media player, a mobile phone, or a convergence device combining these types of devices in a single physical package. Or course, target device 125 may also be a personal computer system. Target device 125 may also be a development board having all the hardware components of a prototype device. As shown, target device 105 includes a display screen 130, a frame buffer 135, graphics processing unit (GPU) 140, an instrumented driver 150, a CPU 155 and graphics application 160.

Graphics application 160 represents a software application executing on CPU 155. For example, graphics application 160 may be a video game running on a hand-held gaming device. Central processing unit (CPU) 155 is the processor executing graphics application 160. In one embodiment, graphics application 160 may invoke functions configured to perform specific graphics rendering tasks, typically defined by a graphics API (e.g., the OpenGL API). One well-known graphics task defined by graphics APIs is a call to a "draw" operation. When graphics application 160 invokes functions provided by the graphics API, such as a draw call, instrumented driver 150 may be configured to perform the command on GPU 140. More generally, instrumented driver 150 may implement the functionality of a standardized interface provided by the graphics API for the specific graphics hardware of target device 125.

Illustratively, instrumented graphics driver 150 includes a target component $110_2$ of a graphical application debugger. In one embodiment, target component $110_2$ provides a counterpart to the host component $110_1$. In addition to implementing the functions of a graphics API, instrumented driver 150 may include code instructions that monitor and record performance and state data related to specific components of GPU 140. For example, instrumented driver 150 may include code instructions that output state data and performance information regarding the operations of graphics pipeline 145.

Graphics pipeline 145 may provide a collection of shading units configured to perform 3D graphics functions. As is known, this usually includes functions to compute lighting effects, object transformations, and 3D motion, among others. Common shader units that may be present on graphics pipeline 145 include a vertex shader unit, geometry shader unit, pixel shader unit, and raster operations unit. As is known, the shading units of a graphics pipeline may be configured to serially process graphics data, beginning from a set of graphics primitives, and ultimately determine a color and intensity value for each picture element (i.e., for each pixel) on display screen 130. Typically, pixel values are computed and stored in frame buffer 135 until a complete image is generated and output to display screen 130.

Figure 2:
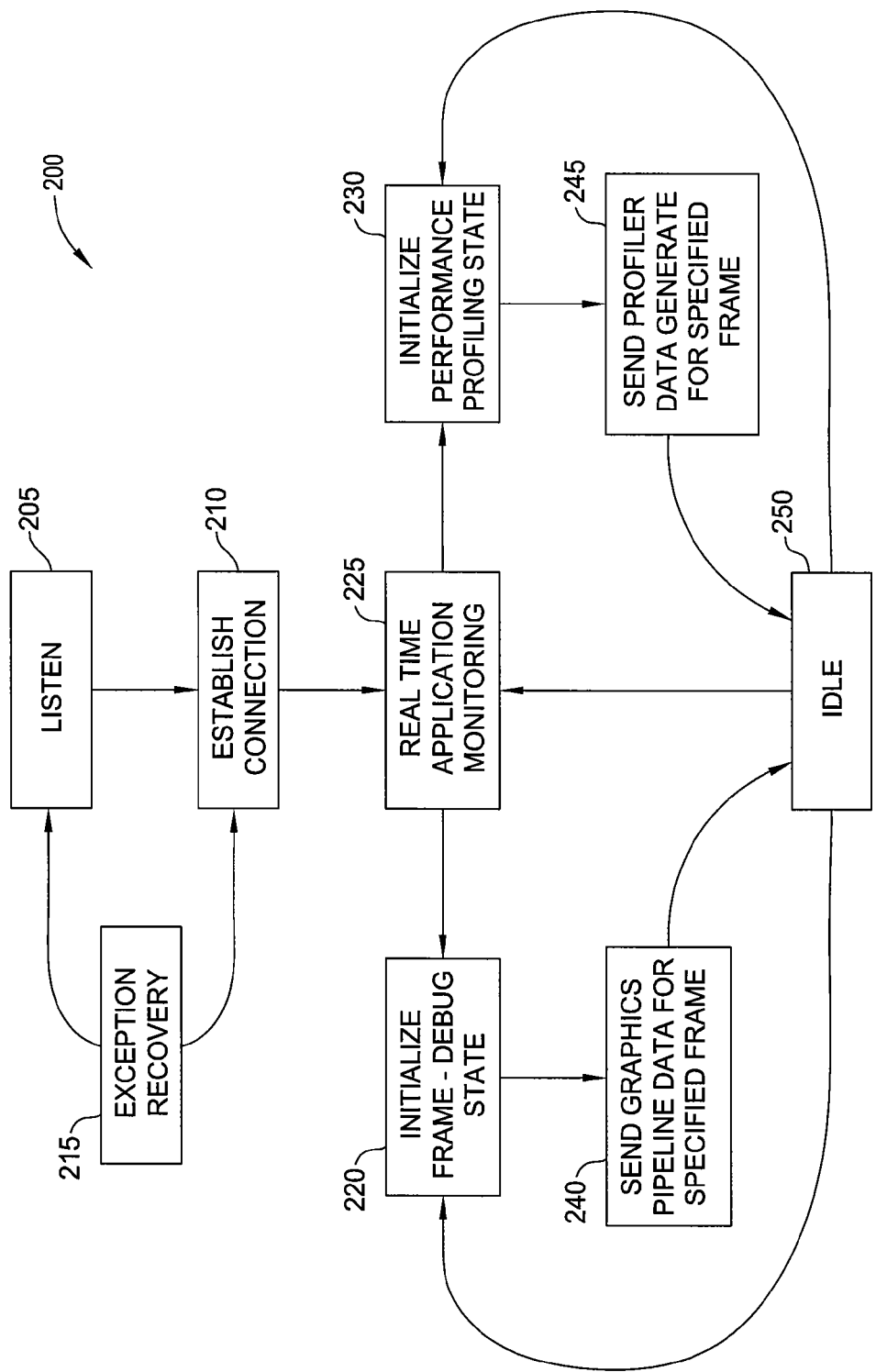
FIG. 2 illustrates a state diagram of a communication protocol used by a host system to debug and tune a graphics application running on a remote device, according to one embodiment of the invention.

FIG. 2 illustrates a state diagram 200 of a communication protocol used by a target device executing a graphics application being debugged by a graphical application debugger running on a host system, according to one embodiment of the invention. As shown, state diagram 200 includes a collection of target device states 205-250, and a set of transitions between states represented by the directed arrows linking states 205-250. Listen state 205 corresponds to a state where a graphics application may be running on a target device, but no connection is presently established between the target device and host system running a graphical debugging application. In such a state the instrumented driver may listen for a command from a host system. From state 205, the target device may transition to an establish connection state 210 when a command is received from the host system to establish a connection. In state 210, the target device may engage in a "handshake" operation with a host system. In one embodiment, for example, the target device may send a four-byte (or other size) value over the communication link to identify the type of target device, capabilities of the graphics pipeline, what version of the instrumented driver is running on the target device, and other similar types of information. The target device may remain in state 210 until receiving a response message from the host system, completing the "handshake." If an error occurs, the target device may transition to an exception recovery state 215 and then back to either of states 205 and 210.

Once a connection is established between the target device and the host system, the target device may transition to real-time application monitoring state 225. While in state 225, the target device may execute a graphics application and render frames using the GPU and graphics pipeline. At the same time, the target component of the graphical application debugger included in the instrumented driver may record performance and state data related to the GPU and the graphics pipeline. In one embodiment, the instrumented driver may be configured to transmit the performance data over the communications link established with the host system. Typically, while in state 225, the developer interacts with the graphics application running on the target device until identifying a frame which exhibits poor performance or unwanted visual artifacts. At such a time, the developer may transition the state of the target device from state 225 to either an initialize frame-debug state 220 or an initialize performance-profiling state 230.

In frame-debug state 220, the instrumented driver may be configured to suspend the application running on the target device along with the processing being performed on the graphics pipeline. The target device may transition to state 220 in response to receiving a command to do so from the host system. From state 220, the target device may transition to a send frame state 240, where the instrumented driver transmits information about the selected frame to the graphical application debugger running on the host system. For example, the instrumented driver may transmit the contents of texture buffers, values of filtering parameters, the parameters supplied to the draw calls used to draw the frame, the geometry and vertex data supplied to the graphics pipeline, etc. Once transmitted, the developer may inspect and evaluate a broad variety of elements related to the selected frame where the application was suspended.

In performance-profiling state 230, the instrumented driver may also suspend the application running on the target device. From state 230, the target device may transition to a send frame state 245, where the instrumented driver performs a series of tests to query various driver and GPU performance counters for each draw call in the current frame and transmit this information to the graphical application debugger running on the host system.

From states 240 and 245, after transmitting either the frame debugging data or the performance profile data, the target device may transition to an idle state 250. The target device may remain in this state until receiving a command from the graphical application debugger running on the host system to transition to back to one of initialize frame-debug state 220, real-time application monitoring state 225, or initialize performance-profiling state 230.

Figure 3:
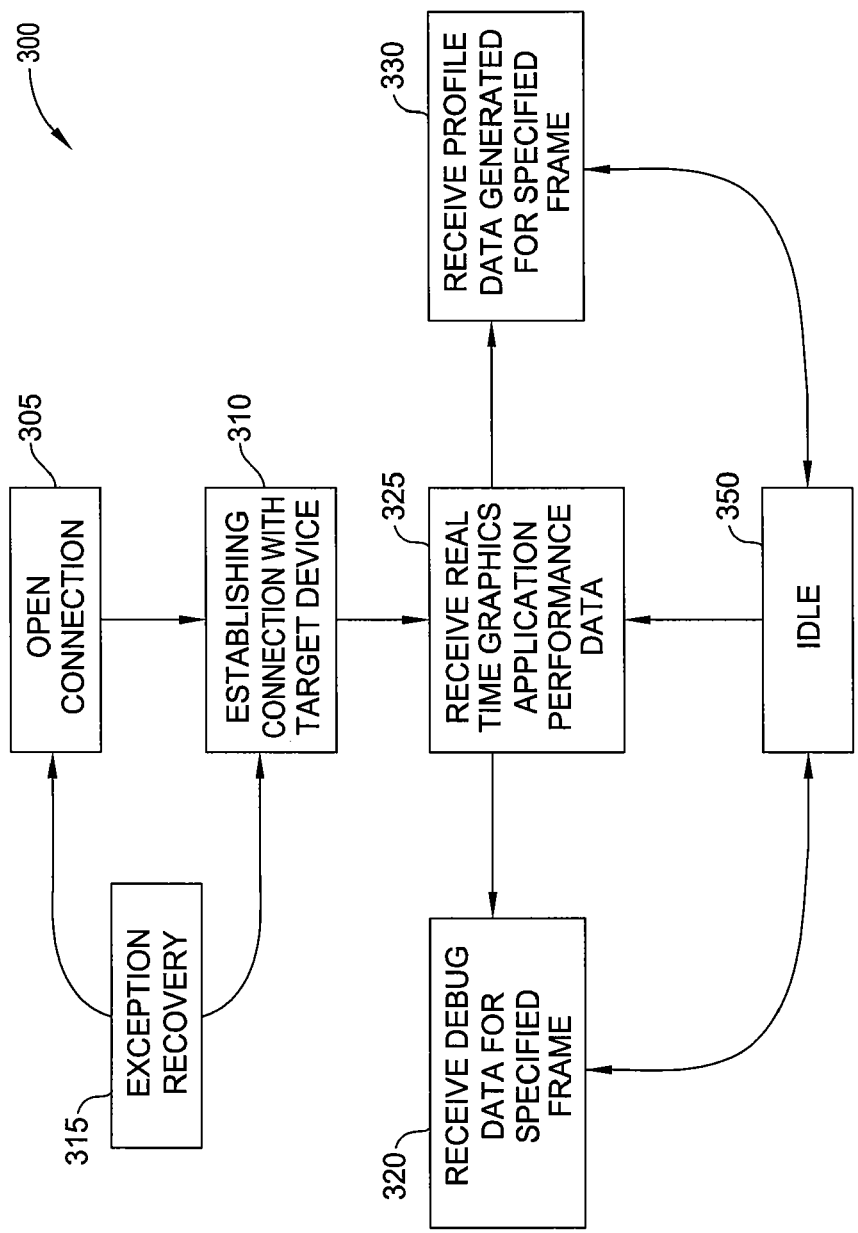
FIG. 3 illustrates a state diagram for a communication protocol of a target system executing a graphics application being debugged by a graphical application debugger running on a host system, according to one embodiment of the invention.

FIG. 3 illustrates a state diagram 300 of a communication protocol used by a host system configured to debug and tune a graphics application running on a remote device, according to one embodiment of the invention. State diagram 300 corresponds to state diagram 200, from the perspective of the host system. The commands received by the target device are sent by the host system, and the responses and data sent by the target device are received by the host system. As shown, state diagram 300 includes a collection of host system states 305-350, and a set of transitions between states 305-350 represented by the directed arrows. An open connection state 305 corresponds to a state where the host system sends a command to the target device (then in a listen state 205). From state 305, the host system device may transition to an establish connection state 310. In this state, the host system may engage in its part of the "handshake" operation mentioned above. In one embodiment, for example, the host system may send a four-byte (or other sized) value over the communication link to provide the target device with information related to the capabilities of the graphical application debugger running on the host system. If an error occurs, the host system may transition to an exception recovery state 315 and then back to either of states 305 and 310.

Once a connection is established between the target device and the host system, the host system may transition to a performance data receiving state 325 (corresponding to real-time monitoring state 225 of the target device). While in state 325, the host system may receive data over the communications link related to the performance of the target device. The host system may present this data to the developer with any combination of graphs, charts, or tables highlighting different aspects of application performance. In one embodiment, the graphical application debugger on the host system may use timing graphs to show how much time is being spent on various tasks for each frame. This information may include, for example, milliseconds per frame, percentage of time the CPU or GPU sits idle, memory usage, number of draw calls, overhead, and amount of time shading units of the graphics pipeline are active or idle, etc. Typically, while in state 325, the developer may interact with the graphics application running on the target device until identifying a frame which exhibits poor performance or unwanted visual artifacts.

In state 320, corresponding to states 220 and 240 of the target device, the host system may receive debug information from the target device for a selected frame. As mentioned, for example, the instrumented driver may send the host system the contents of texture buffers, values of filtering parameters, the parameters supplied to the draw calls used to draw the frame, the geometry and vertex data supplied to the graphics pipeline, etc. Once transmitted, the developer may user the graphical application debugger running on the host system to evaluate elements of the selected frame.

In state 330, corresponding to states 230 and 245 of the target device, the host system may receive profile information from the target device related to the profiled performance characteristics of the target device. From states 320 and 330, after receiving the frame debugging data or the performance profile data, the host system may transition to an idle state 350. In state 350, the communications link remains established and available, but no commands are sent from the host system to the target device. The host system may remain in state 350 until a developer uses the graphical application debugger to send a command to transition to back to one of states 320, 325, and 330.

Figure 4:
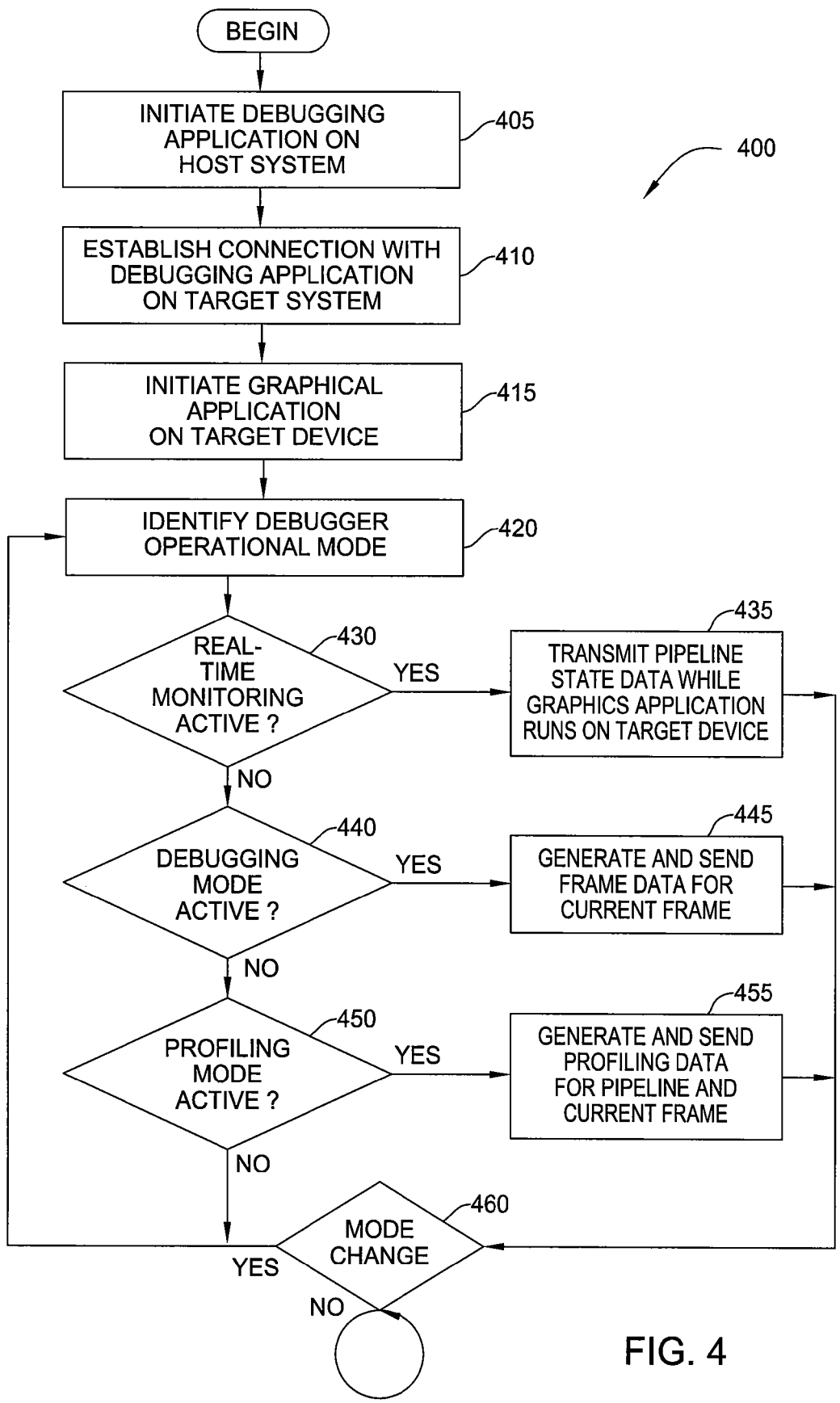
FIG. 4 is a flow diagram illustrating a method for a host system to debug and tune a graphics application running on a remote graphics device, according to one embodiment of the present invention.

FIG. 4 is a flow diagram illustrating a method 400 for a host system to debug and tune a graphics application running on a remote graphics device, according to one embodiment of the present invention. Persons skilled in the art will understand that even though the method is described in conjunction with the systems of FIG. 1, any system configured to perform the steps of method 400, in any order, is within the scope of the present invention.

At step 405, the developer may initiate a debugging application on the host system. Once initiated, at step 410, the debugging application may begin establishing a connection with a target device. For example, the debugging application on the host system may send a command over a communication link to begin the "handshake" process mentioned above and wait for a response from the target device. At step 415, the developer may initiate the graphical application on the target device.

With the connection established, the graphical debugging application running on the host system may be used to debug the application running on the target device. Accordingly, at step 420, a loop begins that includes steps 420-460, in which the instrumented driver of the target device sends data regarding the application being debugged to the host system, based on the operational mode selected by the developer. At step 420, the target device identifies the operational mode of the debugger. In one embodiment, when first initiated, the graphical debugging application begins in the real-time streaming mode until the developer transitions to another mode. At step 430, if the real-time monitoring mode is active, then at step 435, the instrumented driver transmits pipeline state data while the graphics application executes on the target device. As stated, for example, for example, the instrumented driver may send data to the host system regarding milliseconds per frame, percentage of time the CPU or GPU sits idle, memory usage, number of draw calls, overhead, and amount of time shading units of the graphics pipeline are active or idle, etc. The host system receives this information and may display any combination of graphs, charts, or tables highlighting different aspects of application performance. Additionally, while in the real-time monitoring mode, the developer may be able to control some aspects of the graphical application running on the target device. For example, the developer may change the animation speed of graphical application, temporarily alter or disable state elements of the graphics API (e.g., lighting), etc.

At step 460, once the developer identifies a frame to evaluate in detail, the developer may use the graphical application debugger to send a mode change command to the target device. Method 400 then returns to step 420, where the target device identifies the operational mode of the debugger.

At step 440, if a frame-debug mode is active, then the instrumented driver on the target device may generate and send frame data for the currently selected frame to the host system. As stated, in frame-debug mode, the instrumented driver may transmit the contents of texture buffers, values of filtering parameters, the parameters supplied to the draw calls used to draw the frame, the geometry and vertex data supplied to the graphics pipeline, frame buffer contents, etc.

Alternatively, at step 450, if the developer has selected a profiling mode, then at step 455, the instrumented driver on the target device may generate and send profiling data for the currently selected frame to the host system. As stated, in performance profiling mode, the instrumented driver may perform a series of tests to query performance of the graphics pipeline. From steps 435, 445, and 455, method 400 may transition to step 460 until a subsequent mode change is detected.

Figure 5:
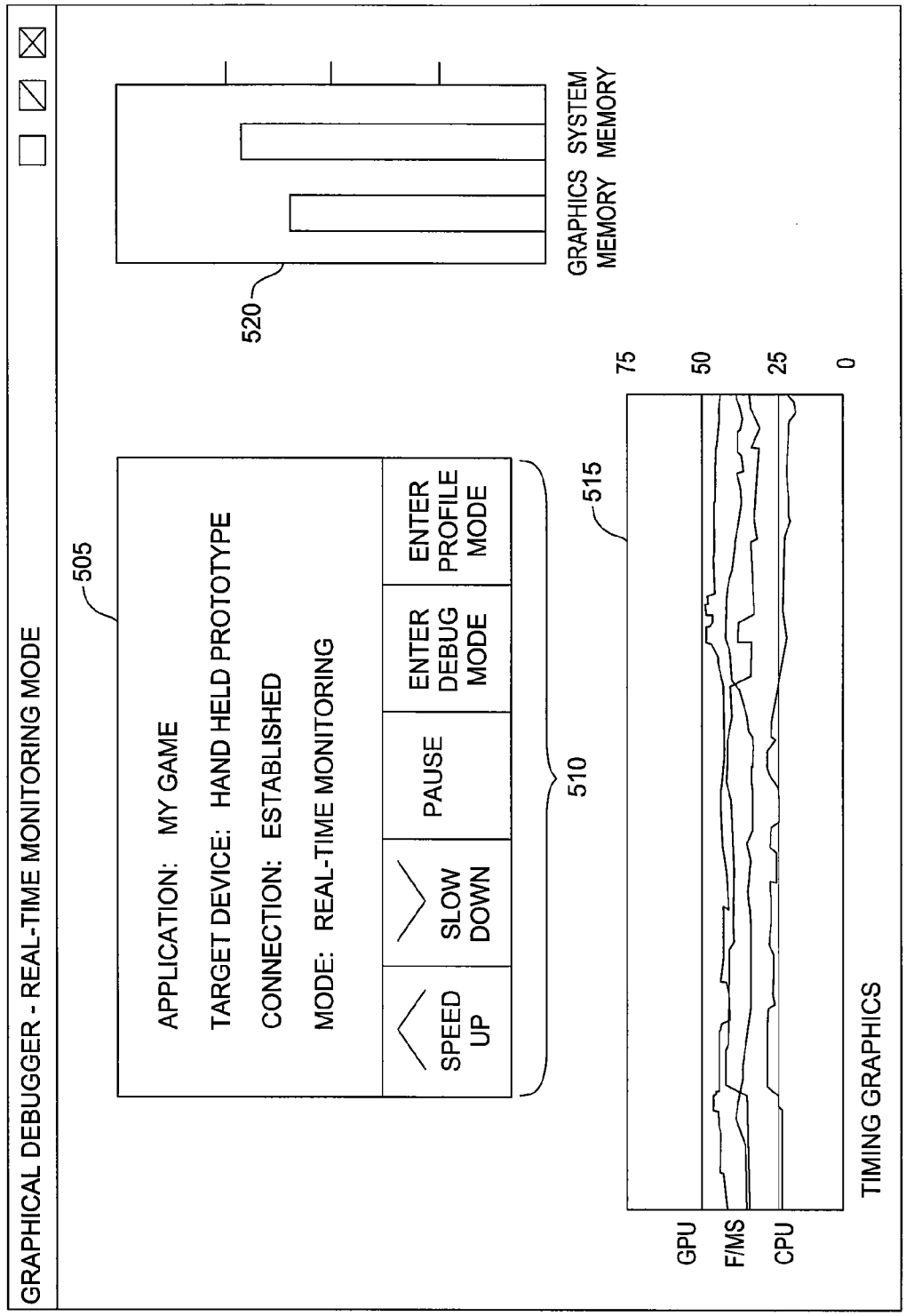
FIGS. 5-7 are conceptual illustrations of a user interface of a graphical application debugger running on host system used to debug and tune a graphics application running on a target device, according to one embodiment of the invention.
Figure 6:
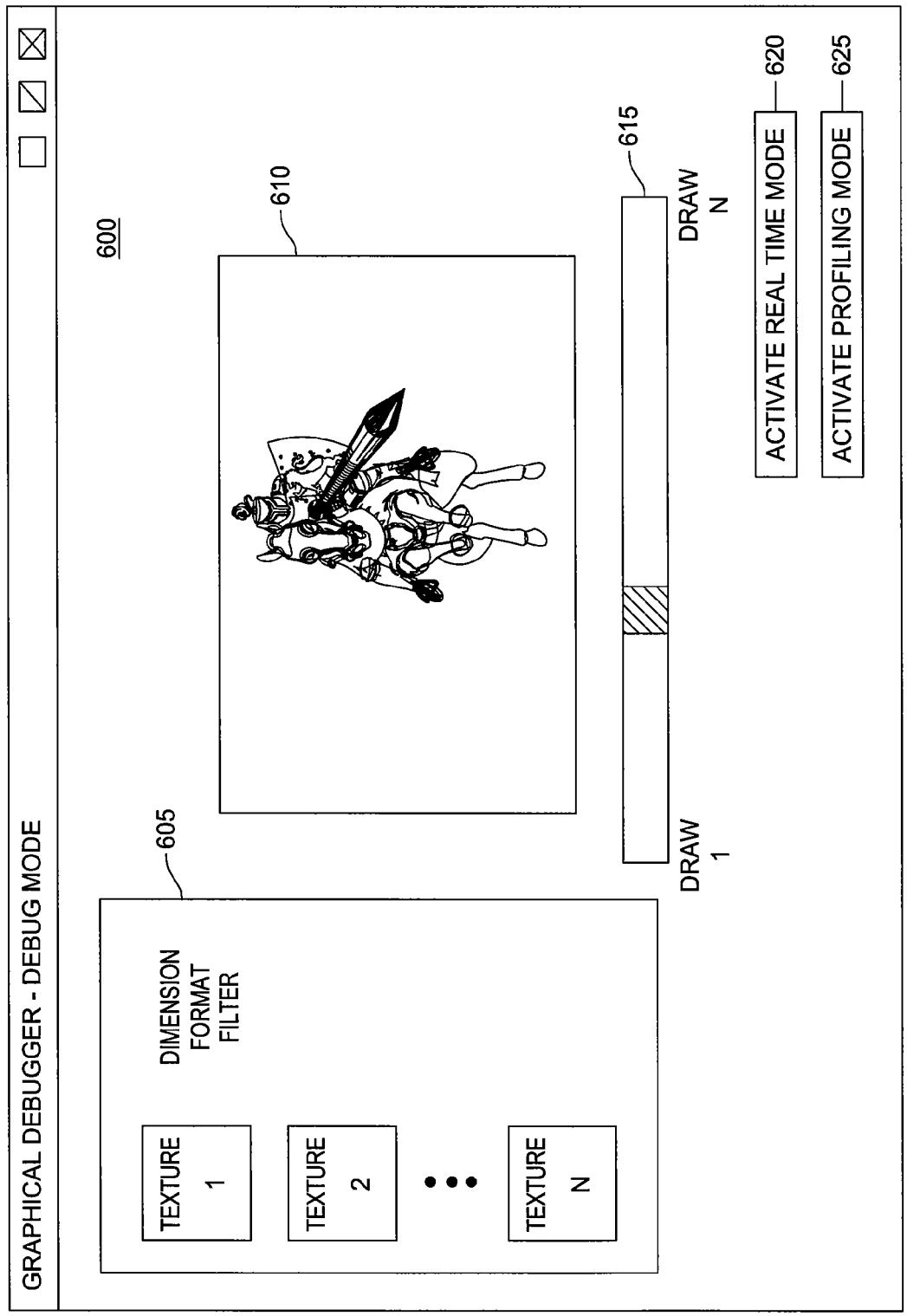
Figure 7:
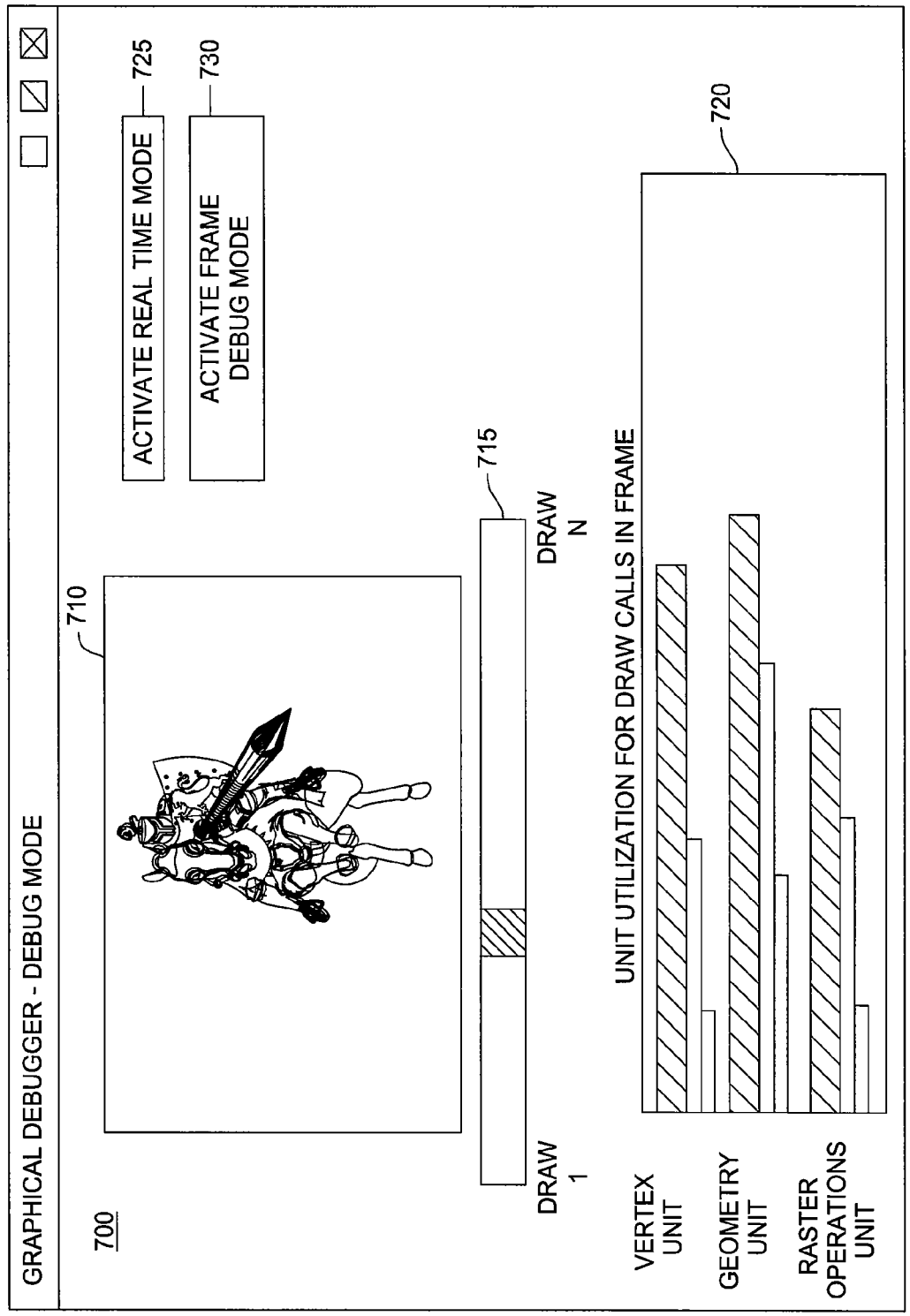

FIGS. 5-7 are conceptual illustrations of a user interface of a graphical application debugger running on host system used to debug and tune a graphics application running on a target device, according to one embodiment of the invention. More specifically, FIG. 5 illustrates an exemplary view of an interface for the real-time monitoring mode of the graphical application debugger running on the host system (state 325 of FIG. 3). As shown, interface 500 includes a status box 505 indicating the name of a graphical application running of particular type of target device. Also, status box 500 indicates that a connection has been established and that the graphical application debugger is currently in a real-time monitoring mode. A collection of buttons 510 may be used to increase or decrease animation speed on the target device, pause rendering on the target device, or transition to other modes.

Also as shown, timing graphs 515 and bar graphs 520 present a visual indication of the performance of the graphics pipeline on the target device. Illustratively, timing graphs 510 show a timing graph for CPU and GPU utilization as well as a frame rendering rate. Bar graphs 520 provide an indication of how much video memory and system memory is being used on the target device. Of course, the content of timing graphs 515 and bar graphs 520 provide examples of what information may be communicated from a target device and presented on interface 500, and other aspects of the real-time rendering performed by the target device may be presented on interface 500. Additionally, interface 500 may allow the developer to modify the rendering state of the target device to isolate portions of the graphics pipeline or evaluate different aspects of rendering performance. For example, the developer may test for texture bandwidth bottlenecks by forcing the GPU to use 2×2 textures, isolate the vertex unit by using 1×1 scissor rectangle to clip all rasterization and pixel processing, or evaluate driver overhead by sending a command to the instrumented driver telling it to ignore all draw calls. Of course, other debugging techniques may be used.

As described, a developer may interact with the graphics application running on the target device until identifying a frame which exhibits poor performance or unwanted visual artifacts. When such a frame is identified, the developer may transition the graphical application debugger to a debug mode as described above.

FIG. 6 illustrates an exemplary view of an interface for the frame-debug mode of the graphical application debugger running on the host system (state 320 of FIG. 3). As shown, interface 600 includes a texture display 605, a rendering frame display 610, a slider bar 615, and buttons 620 and 625. Rendering frame display 610 shows the state of a rendering frame, as each draw call is performed. Slider bar 615 may be used to step through each draw call used to create the frame. For a given draw call, determined based on the position of slider bar 615, texture display 605 may display the contents of the texture units on the target device set for that particular draw call. Buttons 620 and 625 may be used to transition to other debugging modes. Of course, interface 600 provides an example of an interface on a graphical application debugger, and the layout and content may be adapted to suit the needs of developers in a particular case.

FIG. 7 illustrates an exemplary view of an interface 700 for the performance-profile mode of the graphical application debugger running on the host system (state 330 of FIG. 3). As stated, the when the host system transitions the target device to the profiling mode, the instrumented driver performs a series of tests to query various driver and GPU performance counters for each draw call in the current frame. In one embodiment, this information may be transmitted to the host system for display on the interface provided by the graphical application debugger.

Illustratively, interface 700 shows data obtained from the instrumented driver after performing a series of tests to query various driver and GPU performance counters for each draw call in the current frame. As shown, interface 700 consists of a rendering frame display 710, a slider bar 715, a unit utilization graph 720, and buttons 725 and 730. Rendering frame display 710 shows the state of a rendering frame, as each draw call is performed. Slider bar 715 allows the developer to efficiently navigate through the draw calls of the selected frame. Illustratively, unit utilization graph 720 shows unit unitization bars for the major units of the graphics pipeline, in this case, a geometry shader unit, vertex shader unit, and a raster operations unit. As shown, for each such unit, the longest bar represents the utilization of that unit for the frame as a whole. The next bar shows the utilization of the units for a group of related draw calls. For example, performance data may be grouped for all draw calls utilizing the shame shader programs, raster operation states and render targets. The shortest bar for each unit represents the utilization of that unit for the current draw call, as specified by the slider 715. Buttons 725 and 730 may be used to transition to other debugging modes. Of course, interface 700 provides an example of an interface on a graphical application debugger, and the layout and content may be adapted to suit the needs of developers in a particular case. For example, other performance visualizations may include draw call durations, double speed z and stencil usage, pixel counts, etc.

Embodiments of the invention provide a data communications protocol and client server architecture used for the performance analysis and debugging of a graphics application running on a remote device. Advantageously, by providing a client server system for analysis and performance tuning, embodiments of the invention allow developers to isolate and optimize performance bottlenecks in a graphics pipeline on the target device.

While the foregoing is directed to embodiments of the present invention, other and further embodiments of the invention may be devised without departing from the basic scope thereof, and the scope thereof is determined by the claims that follow.

We claim:

1. A method for debugging and performance-tuning a graphics application configured to execute on a target device, comprising:

establishing a communication link between the target device and a host system executing a host component of a graphical application debugger;

invoking the graphics application on the target device, wherein the graphics application is configured to invoke graphics commands provided by an instrumented driver provided for a graphics pipeline present on the target device, and wherein the instrumented driver includes a target component of the graphical application debugger configured to record performance and state data related to the execution of the graphics application on the target device;

determining a first operational state of the target component;

based on the first operational state of the target component, transmitting a portion of the recorded performance and state data related to the execution of the graphics application on the target device to the host component over the communications link; and transmitting, from the host component to the target device over the communications link, commands that control a graphics processing unit to change an animation speed of the graphics application or cull out specified batches of graphics primitives.

2. The method of claim 1, further comprising:

receiving, by the host system, the recorded performance and state data, and based on the first operational state, generating a user interface display on the host system.

3. The method of claim 1, wherein the communications link is one of a TCP/IP network connection, a USB connection, a Firewire connection, or an inter-process messaging system.

4. The method of claim 1, wherein the target device is one of a hand-held video game device, a hand-held media player, a mobile phone, a development board containing a prototype device, a personal computer system, or a convergence device providing a combination thereof.

5. The method of claim 1, wherein the first operational state is a real-time performance mode, and wherein, while the graphics application renders frames, recording the performance and state data for each frame rendered by the graphics pipeline on the target device.

6. The method of claim 1, wherein the operational state is a frame-debug mode, and wherein the instrumented driver is configured to query driver and graphics pipeline counters for each draw call in a selected frame rendered by the graphics pipeline and to transmit the driver and graphics pipeline performance counters to the graphical application debugger running on the host system.

7. The method of claim 1, wherein the operational state is a performance-profiling mode, and wherein the instrumented driver is configured to perform a plurality of performance tests for a selected frame rendered by the graphics pipeline and to transmit a result of the performance tests to the graphical application debugger running on the host system.

8. The method of claim 1, wherein the host system is configured to transition the first operational state of the target component to a second operational state by sending a command over the communication link.

9. A non-transitory computer-readable storage medium that includes program instructions that when executed by a processor cause the processor to debug and performance-tune a graphics application configured to execute on a target device, by performing the steps of:
 establishing a communication link between the target device and a host system executing a host component of a graphical application debugger;
 invoking the graphics application on the target device, wherein the graphics application is configured to invoke graphics commands provided by an instrumented driver provided for a graphics pipeline present on the target device, and wherein the instrumented driver includes a target component of the graphical application debugger configured to record performance and state data related to the execution of the graphics application on the target device;
 determining a first operational state of the target component;
 based on the first operational state of the target component, transmitting a portion of the recorded data related to the execution of the graphics application on the target device to the host component over the communications link; and
 transmitting, from the host component to the target device over the communications link, commands that control a graphics processing unit to change an animation speed of the graphics application or cull out specified batches of graphics primitives.

10. The computer readable storage medium of claim 9, further comprising:
 receiving, by the host system, the recorded performance and state data, and
 based on the first operational state, generating a user interface display on the host system.

11. The computer readable storage medium of claim 9, wherein the communications link is one of a TCP/IP network connection, a USB connection, a Firewire connection, or an inter-process messaging system.

12. The computer readable storage medium of claim 9, wherein the target device is one of a hand-held video game device, a hand-held media player, a mobile phone, a development board containing a prototype device, a personal computer system, or a convergence device providing a combination thereof.

13. The computer readable storage medium of claim 9, wherein the first operational state is a real-time performance mode, and wherein, while the graphics application renders frames, recording the performance and state data for each frame rendered by the graphics pipeline on the target device.

14. The computer readable storage medium of claim 9, wherein the operational state is a frame-debug mode, and wherein the instrumented driver is configured to query driver and graphics pipeline counters for each draw call in a selected frame rendered by the graphics pipeline and to transmit the driver and graphics pipeline performance counters to the graphical application debugger running on the host system.

15. The computer readable storage medium of claim 9, wherein the operational state is a performance-profiling mode, and wherein the instrumented driver is configured to perform a plurality of performance tests for a selected frame rendered by the graphics pipeline and to transmit a result of the performance tests to the graphical application debugger running on the host system.

16. The computer readable storage medium of claim 9, wherein the host system is configured to transition the first operational state of the target component to a second operational state by sending a command over the communication link.

17. A system for debugging and performance-tuning a graphics application configured to execute on a target device, comprising:
 a communication link between a target device and a host system, wherein the host system executes a host component of a graphical application debugger; and
 an instrumented driver on the target device that is provided for a graphics pipeline within a graphics processing unit present on the target device, and includes a target component of the graphical application debugger, wherein the graphics application is configured to invoke graphics commands provided by the instrumented driver for execution by the graphics pipeline present on the target device, and wherein the target component of the graphical application debugger is further configured to:
  record performance and state data related to the execution of the graphics application on the target device in a memory that is coupled to the graphics processing unit,
  determine a first operational state of the target component,
  based on the first operational state of the target component, transmitting a portion of the recorded data related to the execution of the graphics application on the target device to the host component over the communications link, and
  transmit, from the host component to the target device over the communications link, commands that control the graphics processing unit to change an animation speed of the graphics application or cull out specified batches of graphics primitives.

18. The system of claim 17, wherein the host system is configured to
 receive the recorded performance and state data, and
 based on the first operational state, generate a user interface display on the host system.

19. The system of claim 17, wherein the communications link is one of a TCP/IP network connection, a USB connection, a Firewire connection, or an inter-process messaging system.

20. The system of claim 17, wherein the target device is one of a hand-held video game device, a hand-held media player, a mobile phone, a development board containing a prototype device, a personal computer system or a convergence device providing a combination thereof.

21. The system of claim 17, wherein the first operational state is a real-time performance mode, and wherein, while the graphics application renders frames, recording the performance and state data for each frame rendered by the graphics pipeline on the target device.

22. The system of claim 17, wherein the first operational state is a frame-debug mode, and wherein the instrumented driver is configured to query driver and graphics pipeline counters for each draw call in a selected frame rendered by the graphics pipeline and to transmit the driver and graphics pipeline performance counters to the graphical application debugger running on the host system.

23. The system of claim 17, wherein the first operational state is a performance-profiling mode, and wherein the instrumented driver is configured to perform a plurality of performance tests for a selected frame rendered by the graphics pipeline and to transmit a result of the performance tests to the graphical application debugger running on the host system.

24. The system of claim 17, wherein the host system is configured to transition the first operational state of the target component to a second operational state by sending a command over the communication link.

* * * * *